(No Model.)

F. A. J. SMART.
PLANT PROTECTOR.

No. 419,370. Patented Jan. 14, 1890.

Witnesses
Jos. H. Blackwood
K. Bickford

Inventor
Fred A. J. Smart
By his Attorney

UNITED STATES PATENT OFFICE.

FRED A. J. SMART, OF EFFINGHAM FALLS, ASSIGNOR OF TWO-THIRDS TO GEORGE W. LOUGEE AND ARTHUR P. MERROW, OF FREEDOM, NEW HAMPSHIRE.

PLANT-PROTECTOR.

SPECIFICATION forming part of Letters Patent No. 419,370, dated January 14, 1890.

Application filed September 12, 1889. Serial No. 323,786. (No model.)

*To all whom it may concern:*

Be it known that I, FRED A. J. SMART, a citizen of the United States, residing at Effingham Falls, in the county of Carroll and State of New Hampshire, have invented certain new and useful Improvements in Plant-Protectors; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in devices for protecting early plants.

The object of the invention is to obtain a device of the character described by the use of which insects of all kinds will be kept from growing plants, the rays of the sun directed upon the plants and the ground immediately sourrounding them, and any quantity of fresh air that may be desired admitted thereto.

To the accomplishment of the above the invention consists in certain novel parts and combination of parts, as will be hereinafter fully described and specifically claimed, reference being had to the accompanying drawings, in which—

Figure 1:
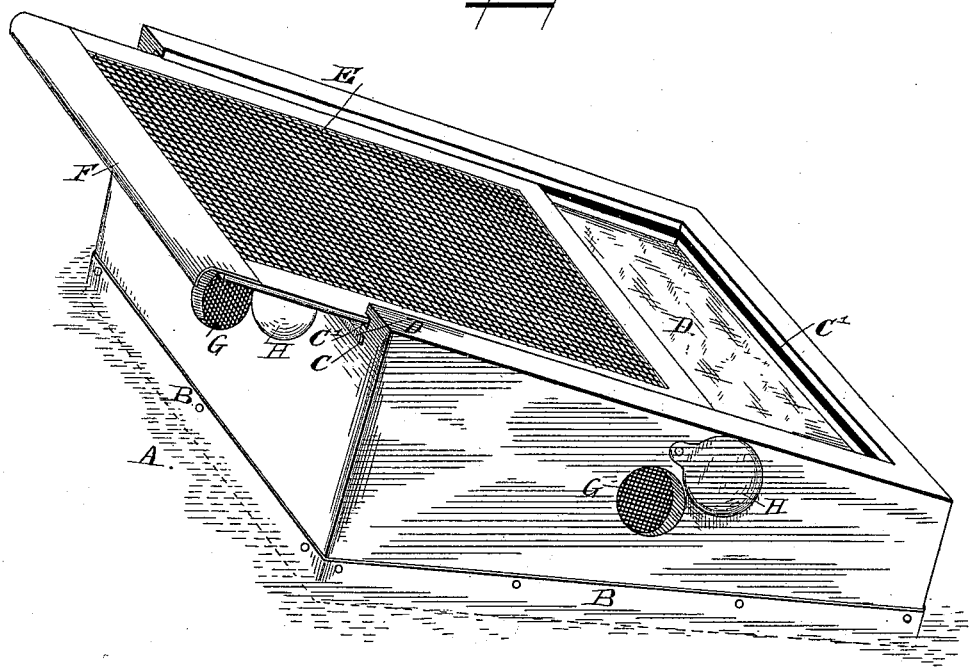
Figure 2:
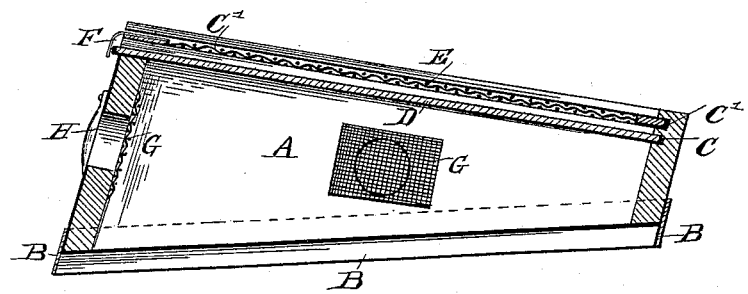

Figure 1 is a view in perspective of the device complete, and Fig. 2 a longitudinal section therethrough.

In the drawings, A represents a frame-work open at the top and bottom, and provided on its lower end with a depending metal flange B, which flange is adapted to be driven into the ground a suitable distance to prevent insects of different kinds from reaching the plants around which the frame-work is placed.

The frame A is preferably arranged on a slant or incline in order that the maximum amount of sun-light may fall upon the glass with which the frame is provided at its upper end. At its upper end the frame A is provided with two sets of grooves, one marked C and the other C', the former being adapted to receive a glass and the latter a wire screen E. As shown in the drawings, the grooves C C', hereinbefore referred to, extend around but three sides of the frame-work, such arrangement being for the purpose of allowing the withdrawal of both screen E and glass D. As shown, the screen rests above the glass, and either the glass or screen may be removed, the screen being removed when more light is desired for the plant, and the glass being removed and the screen used alone where air for the plants is more desired than heat. At one end the screen is provided with a strip F, suitably bent to form a close joint, this construction being especially useful where the glass is not employed, the space formed for such glass being closed by the bent strip. On one or more sides the frame A is perforated, each such perforation being covered on the inside with a suitable wire screen G, and the perforation being adapted to be closed by a pivoted plate H, secured to the outside of the frame, this construction being provided for the more ready ventilation of the plants.

Having thus described my invention, what I claim as new therein, and that for which I desire to secure Letters Patent, is—

1. In a plant-protector, the combination, with a frame A, formed with inclined sides, the latter provided with two grooves C C', of screen E and glass D, arranged to slide in such grooves, as set forth.

2. The combination, in a plant-protector, with frame A, provided with inclined perforated sides, of a glass D and a screen E, located in the grooves of such sides, screens G and pivoted covers H for the perforations, flange B, secured to the frame, and strip F, secured to the screen E, as set forth.

In testimony whereof I affix my signature in presence of two witnesses.

FRED A. J. SMART.

Witnesses:
A. P. MERROW,
STEPHEN J. KENESON.